Figure 1:
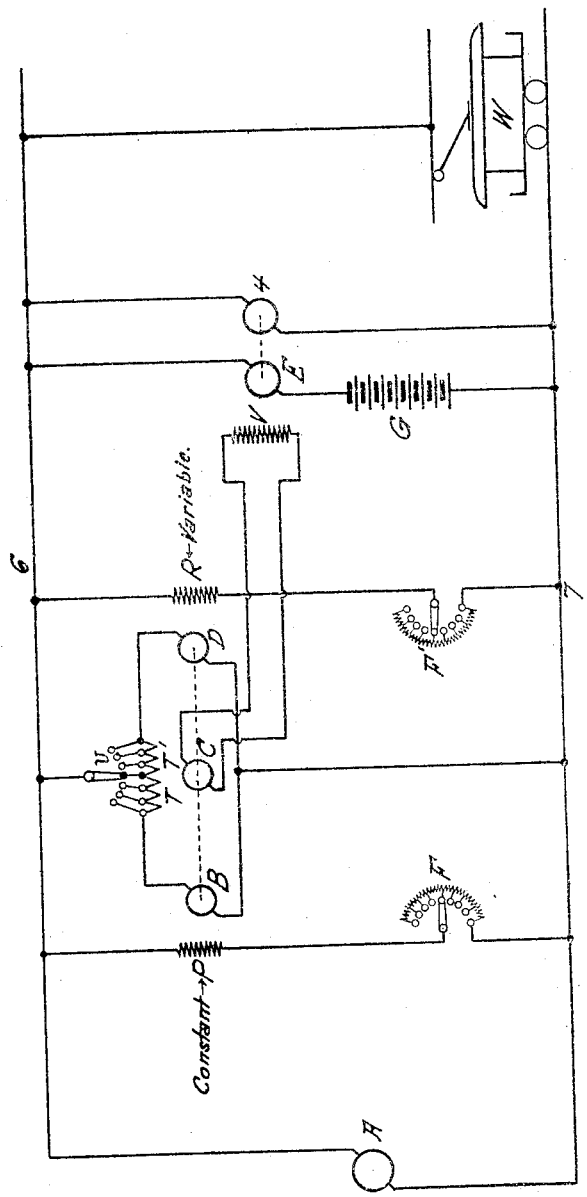

No. 798,038. PATENTED AUG. 22, 1905.
A. S. HUBBARD.
APPARATUS FOR ELECTRICAL REGULATION.
APPLICATION FILED JUNE 17, 1904.
2 SHEETS—SHEET 2.
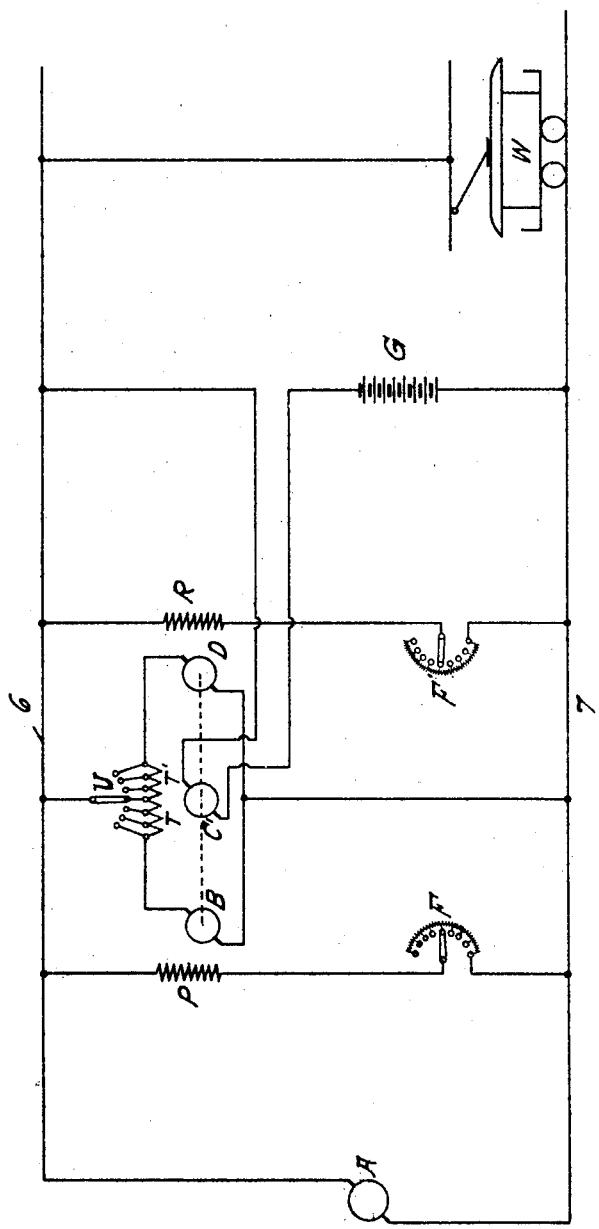

UNITED STATES PATENT OFFICE.

ALBERT S. HUBBARD, OF GREENWICH, CONNECTICUT.

APPARATUS FOR ELECTRICAL REGULATION.

No. 798,038.     Specification of Letters Patent.     Patented Aug. 22, 1905.

Application filed June 17, 1904. Serial No. 212,936.

*To all whom it may concern:*

Be it known that I, ALBERT S. HUBBARD, a citizen of the United States, residing in Greenwich, in the county of Fairfield and State of Connecticut, have invented a new and useful Apparatus for Electrical Regulation, of which the following is a specification.

My invention relates to the automatic regulation of electrical circuits.

While I have specifically applied my invention more particularly to systems of distribution employing a storage battery and booster, such invention in its broader phase is not limited to this specific type of system. When, however, my invention is employed in this type of system, its object is to provide an efficient and economical system for regulating the output and input of the battery and booster circuit by automatically regulating the voltage of the booster and, if desired, the direction of the electromotive force generated by the booster in accordance with the requirements of the system.

I prefer to apply my invention in such a way as to regulate the booster in accordance with the difference of potential across a supply-circuit. It is equally possible, however, to apply my invention to a regulation of the booster in accordance with the difference of potential across any portion of the circuit or in accordance with the current strength in the main circuit or any desired portion of the circuit, and I do not, therefore, limit myself to pressure regulation, although I make in this application no specific claim to the regulation by current strength, as that forms the subject-matter for another application for a patent filed by me February 25, 1905, Serial No. 247,237.

My invention contemplates the employment with the usual supply-conductors of a system of distribution of a pair of electromotive-force generators, preferably but not necessarily dynamo-armatures, placed in other conductors which are in circuit with a source of electric supply and arranged or designed in such a manner that given changes in the electrical condition of the system will produce definite alterations of the relative electrical conditions of the two electromotive-force generators. A third electromotive-force generator, also preferably a dynamo-armature, is so related to the other two electromotive-force generators, as by having field-windings in the circuits thereof, that said definite alterations will produce definite changes in the electromotive force of the third generator for purposes of regulation.

My invention further includes more specific features, by which I am enabled to obtain special advantages from my invention when applied to particular systems of distributions. Thus I prefer that all three of the electromotive-force generators when dynamo-armatures be mechanically connected, so that although the electrical conditions of the several machines may constantly change those acting as motors at any moment may drive those acting as generators and maintain a self-contained regulating apparatus. In other cases it may be preferable to have only the two regulating-dynamos mechanically connected, while the third, or regulated dynamo, is separately driven. I also connect the armatures of the two regulating-dynamos in a local circuit containing the field-winding of the third or regulated dynamo and connect the local circuit to a source of supply, as one of the regular supply-conductors of the system, through said field-winding, so that the current variations in the local circuit will vary the strength and polarity of the field-magnet of the regulated dynamo, as will appear more clearly when describing the diagrams accompanying this specification. When the two electromotive-force generators are dynamos, as they preferably are, they act as motors and receive substantially equal currents from the source of electric supply when the system is in a predetermined electrical condition; but either of the dynamos may become a current-generator when the condition of the system has so changed that the electromotive force of that dynamo arises considerably above that of the other.

By my invention I can obtain close regulation with very small dynamos and with small loss of energy in the regulating apparatus.

Referring to the drawings, Figure 1 represents diagrammatically a system in which my apparatus for autoregulation is applied to a system using a storage battery and booster, the booster being varied by the variations of the electromotive force from a separate exciter. Fig. 2 represents my apparatus for autoregulation applied directly to the field of the booster without an intermediate exciter.

In both of the figures, A represents a main dynamo or group of dynamos delivering energy to a working circuit containing translating devices, such as the trolley-cars W. The current from A passes to the working circuit over the conductors 6 and 7.

G is a storage battery in series with the armature E of a booster in series with said battery. The battery and booster armature are connected in shunt across the conductors 6 and 7, so that when the batteries are discharging the current from them to the working circuit will pass through the said conductors. I have indicated a motor 4 as the means for driving the booster-armature when the booster is acting as a generator, although any other suitable means for driving the booster may be employed, if desired.

V is the field-coil of the booster, and this coil receives its current for exciting the booster from the armature C of a small exciter. The amount and direction of the electromotive force generated by the armature of the booster E will of course be dependent upon the direction and amount of the current in the field-coil V of the booster, and this in turn will be dependent upon the amount of electromotive force produced by the exciter and its direction.

I will show how by my invention I regulate the electromotive force produced by the exciter in accordance with the conditions of the system.

T T' constitute the field-winding of the exciter.

B and D are armatures of small dynamos, preferably mounted on a single shaft, which shaft also carries the exciter-armature C, although some of the benefits of my invention may be obtained if these armatures are not mechanically connected.

P and R are the field-coils, respectively, for armatures B and D.

F and F' are adjustable resistances in the circuits of P and R, respectively. It will be noted that both of these coils P and R are connected between the conductors 6 and 7; but I so design the coils that one of them—say P—saturates its field-magnet at a voltage well below that to be expected in normal operation, while the other coil—say R—is so designed as to be extremely sensitive to changes of voltage between the conductors. It will of course be obvious that it is not material that the substantially constant field of dynamo B should be obtained by the particular means shown, since those skilled in the art are familiar with various means for obtaining substantially constant fields.

Let us assume that it is desired to have the booster add its electromotive force to that of the battery on discharge of the battery when the voltage across the main conductors falls, and increase this electromotive force the more said voltage across the main conductors falls, and that it is also desired that the booster add its electromotive force to the voltage of the generator-circuit when the battery is charging and increase that electromotive force as the electromotive force across that circuit rises, and that at a certain voltage across the main conductors the battery is floating and the booster is not at this latter voltage producing electromotive force in either direction. The dynamo-armatures B and D will equally divide the current between coils T and T' of the exciter. Both B and D will then be operating as motors and will be receiving substantially equal currents. Upon increase of load at W causing decrease of voltage across the conductors 6 and 7 the magnet energized by coil R will become weakened, reducing the counter electromotive force of armature D and causing more current to flow through coil T' than through coil T. This causes the exciter C to generate electromotive force in a given direction, the value of said electromotive force being dependent upon the difference between the currents in T and T'. Obviously the greater the drop of the voltage the greater the disproportion of the currents in T and T', and therefore the greater will be the electromotive force of the exciter and the electromotive force produced by the booster to assist the battery in discharging and to cause the battery-circuit to assist the main generator A. The drop of voltage may go so far as to cause the entire current from the main circuit and the local circuit to pass through coil T', so that the machine B would become a generator driven by the machine D, and the current thus generated by D would pass through coils T and T' in the same direction and further add to the electromotive force produced by the exciter. On the other hand, when the battery is charging if the battery has a high counter electromotive force it will receive little or no current unless the main dynamo is assisted by the booster. The less is the volume of the charging-current the greater will be the voltage between 6 and 7, (assuming that the main generator A, in combination with the conductors 6 and 7, has a falling characteristic,) and therefore the greater is this voltage the higher will be the electromotive force produced by the booster. When, therefore, the voltage between 6 and 7 rises, the coil R will increase the strength of the magnet of dynamo D and the greater portion of the current from the supply-circuit and the local circuit will pass through field-coil T, causing the exciter to generate an electromotive force in the opposite direction to that which was assumed on the condition of discharge, and the greater is the voltage between 6 and 7 the greater will be the current passing through coil T, and therefore the greater will be the electromotive force of the booster.

The foregoing description has assumed conditions that may be varied considerably without departing from my invention. Thus my invention is applicable to such a system if the main generator A is cut out of action or there is no such generator provided. Again, the foregoing description has assumed a falling characteristic for the main generator A in combination with the conductors 6 and 7; but I might employ my invention where there is a rising characteristic and so design the regulating apparatus that an increase of voltage would effect the same regulation on the booster as a decrease of voltage does under the described conditions.

The system may be adjusted for different conditions by such a device as the switch V, which varies the point at which the field-winding T T' is connected to the conductors 6.

As an illustration of the application of my invention, Fig. 2 shows at C' that the booster may be the dynamo that is directly regulated by the alteration of the relative conditions of armatures B and D.

It will be seen from the foregoing description that my invention may be varied in many ways without altering in any way its essential character, and such variation will naturally be made according to the necessities of the particular system to be regulated.

What I claim as new, and desire to secure by Letters Patent, is—

1. The combination with the supply-conductors of a system of distribution, of a pair of dynamos whose armatures are in circuit with each other and in connection with a source of supply, field-windings connected to the system and arranged so that for a predetermined condition of the system both dynamos act as motors and receive substantially equal currents from said source of supply while changes in the condition of the system alter the relative electrical condition of said dynamos, an electromotive-force generator, and means for causing variations in said relative electrical conditions to vary the electromotive force of said generator for purposes of regulation.

2. The combination with the supply-conductors of a system of distribution, of a pair of dynamos whose armatures are in circuit with each other and in connection with a source of supply, field-windings connected to the system and arranged so that for a predetermined condition of the system both dynamos act as motors and receive substantially equal currents from said source of supply while changes in the condition of the system alter the relative electrical condition of said dynamos, a third dynamo, and means for causing variations in said relative electrical conditions to vary the electromotive force produced by said third dynamo.

3. The combination with the supply-conductors of a system of distribution, of a pair of dynamos whose armatures are in circuit with each other and in connection with a source of supply, field-windings connected to the system and arranged so that for a predetermined condition of the system both dynamos act as motors and receive substantially equal currents from said source of supply while changes in the condition of the system alter the relative electrical condition of said dynamos, a third dynamo, and field-coils therefor located between said dynamo-armatures and connecting them with said source of supply.

4. The combination with the supply-conductors of a system of distribution, of a pair of electromotive-force generators placed in other conductors connected to a source of electric supply, means for causing changes of the electrical condition of the system to alter the relative electrical conditions of said electromotive-force generators, a third electromotive-force generator, and controlling-coils therefor in the circuits of the aforesaid electromotive-force generators.

5. The combination with the supply-conductors of a system of distribution, of a pair of electromotive-force generators placed in other conductors connected to a source of electric supply, means for causing changes of the electrical condition of the system to alter the relative electrical conditions of said electromotive-force generators, and a dynamo having a field-winding in the circuits of said electromotive-force generators.

6. The combination with the supply-conductors of a system of distribution, of a pair of dynamos the armatures of which are placed in other conductors connected to a source of electric supply, means for causing changes of the electrical condition of the system to alter the relative strengths of the field-magnets of said dynamos, an electromotive-force generator, and controlling-coils therefor in the circuits of the said dynamo-armatures.

7. The combination with the supply-conductors of a system of distribution, of a pair of dynamos the armatures of which are placed in other conductors connected to a source of electric supply, means for causing changes of the electrical condition of the system to alter the relative strengths of the field-magnets of said dynamos, and a third dynamo having a field-winding in the circuits of the aforesaid dynamo-armatures.

8. The combination with the supply-conductors of a system of distribution, of a pair of dynamos the armatures of which are placed in other conductors connected to a source of electric supply, means for causing changes of the electrical condition of the system to alter the relative strengths of the field-magnets of said dynamos, a third dynamo and two field-magnet windings therefor in the circuits of the first aforesaid armatures, connected and arranged to have relatively opposite magnetic effects on the field-magnet of said third dynamo.

9. The combination with the supply-conductors of a system of distribution, of a pair of electromotive-force generators placed in other conductors, means for causing changes of the electrical condition of the system to alter the relative electrical conditions of said electromotive-force generators, a third electromotive-force generator, and a controlling-coil therefor having its ends in circuit with the aforesaid electromotive-force generators, and an intermediate point in circuit with a source of supply.

10. The combination with the supply-conductors of a system of distribution, of a pair of dynamos the armatures of which are placed in other conductors, means for causing changes of the electrical condition of the system to alter the relative strengths of said field-magnets, a third dynamo, and a field-winding therefor, having its ends in circuit with the aforesaid armatures, and an intermediate point in circuit with a source of supply.

11. The combination with the supply-conductors of a system of distribution, of a pair of electromotive-force generators in a local circuit connected to a source of electric supply, means for causing changes of the electrical condition of the system to alter the relative electrical conditions of said electromotive-force generators, a third electromotive-force generator, and controlling-windings therefor located in said local circuit.

12. The combination with the supply-conductors of a system of distribution, of a pair of dynamos whose armatures are connected in a local circuit connected to a source of electric supply, field-windings for said dynamos arranged and connected so that changes of the electrical condition of the system will alter the relative field-magnet strengths of said dynamos, a third dynamo, and field-windings therefor located is said local circuit.

13. The combination with the supply-conductors of a system of distribution, of a pair of dynamos whose armatures are connected in a local circuit connected to a source of electric supply, field-windings for said dynamos arranged and connected so that changes of the electrical condition of the system will alter the relative field-magnet strengths of said dynamos, a third dynamo, and field-windings therefor located in said local circuit and arranged to relatively oppositely magnetize the field-magnet.

14. The combination with the supply-conductors of a system of distribution, of a pair of dynamos whose armatures are connected in a local circuit and in parallel to each other with relation to a source of electric supply, field-windings for said dynamos arranged and connected so that changes of the electrical condition of the system will alter the relative field-magnet strengths of said dynamos, a third dynamo, and field-windings therefor located in said local circuit between said armatures and the source of electric supply.

15. The combination with the supply-conductors of a system of distribution, of a pair of dynamos whose armatures are connected in parallel in a local circuit connected to a source of electric supply, field-windings for said dynamos arranged and connected so that changes of the electrical condition of the system will alter the relative field-magnet strengths of said dynamos, a third dynamo, and field-windings therefor located in said local circuit between said armatures and the source of electric supply and arranged to relatively oppositely magnetize the field-magnet.

16. The combination with the supply-conductors of a system of distribution, of a pair of dynamos whose armatures are connected in a local circuit, field-windings for said dynamos arranged and connected so that changes of the electrical condition of the system will alter the relative field-magnet strengths of said dynamos, a third dynamo, and a connection from a source of electric supply to the said local circuit through the field-winding of said third dynamo.

17. The combination with the supply-conductors of a system of distribution, of a pair of dynamos whose armatures are connected in a local circuit, field-windings for said dynamos arranged and connected so that changes of the electrical condition of the system will alter the relative field-magnet strengths of said dynamos, a third dynamo, and a connection from a source of electric supply to the said local circuit through portions of the field-winding of said third dynamo in parallel.

18. The combination with the supply-conductors of a system of distribution, of a pair of dynamos whose armatures are connected in a local circuit, field-windings for said dynamos arranged and connected so that changes of the electrical condition of the system will alter the relative field-magnet strengths of said dynamos, a third dynamo, a connection from a source of electric supply to the said local circuit through portions of the field-winding of said third dynamo in parallel and means for adjusting the relative value of said portions of the field-winding.

19. As a means of regulating, two dynamos whose armatures are in a local circuit connected with a source of electric supply and at least one of whose field-windings is in an outside circuit that is subject to changes for which regulation is desired, and a third dynamo having a field-winding in the local circuit.

20. As a means of regulation, two dynamos whose armatures are connected in a local circuit in parallel to each other with relation to a source of electric supply, field-windings for said dynamos one of which at least is connected in an outside circuit that is subject to changes for which regulation is desired, and a third dynamo whose armature is not in said local circuit, but with a field-winding connected between the aforesaid armatures.

21. As a means of regulation, two dynamos whose armatures are connected in a local circuit, field-windings for said dynamos one of which at least is connected in an outside circuit that is subject to changes for which regulation is desired, and a third dynamo whose armature is not in said local circuit, but with a field-winding connected between the aforesaid armatures and connecting the local circuit with a source of supply.

22. As a means of regulation, two dynamos whose armatures are in a local circuit connected to a source of electric supply and whose field-windings are connected in a circuit subject to changes for which regulation is desired, means for causing said changes to act on said field-windings to vary the relative magnetic strengths of the field-magnets of the two dynamos, a third dynamo, and means for causing changes of electrical conditions in the local circuit to vary the electromotive force produced by said third dynamo.

23. As a means of regulation, two dynamos whose armatures are in a local circuit connected to a source of electric supply and whose field-magnets are connected in parallel in a circuit subject to changes for which regulation is desired, means for causing said changes to act on said field-windings to vary the relative magnetic strengths of the field-magnets of the two dynamos, and a third dynamo having a field-winding in the local circuit.

24. As a means of regulation, two dynamos whose armatures are in a local circuit and whose field-windings are connected in parallel in a circuit subject to changes for which regulation is desired, means for causing said changes to act on said field-windings to vary the relative magnetic strengths of the field-magnets of the two dynamos, and a third dynamo whose armature is not in said local circuit, but with a field-winding connected between the aforesaid armatures.

25. As a means of regulation, two dynamos whose armatures are in a local circuit and whose field-windings are connected in parallel in a circuit subject to changes for which regulation is desired, means for causing said changes to act on said field-windings to vary the relative magnetic strengths of the field-magnets of the two dynamos, and a third dynamo whose armature is not in said local circuit, but with a field-winding connected between the aforesaid armatures and connecting the local circuit with a source of supply.

26. As a means of regulation, a circuit subject to current fluctuations, two dynamos whose armatures are mechanically connected together and electrically connected to a source of supply acting as motors receiving substantially equal currents when a predetermined current is in said fluctuating circuit, means for causing changes of current in said circuit to alter the relative field strengths of said dynamos, a third dynamo, and means for causing variations in the relative electrical conditions of said two armatures to vary the electromotive force generated by said third dynamo.

27. As a means of regulation, two dynamos whose armatures are mechanically connected together, means for electrically connecting said armatures to a source of electric supply, means for causing changes of the electrical condition in the circuit for which regulation is desired to alter the relative field strengths of said dynamos, a third dynamo, and field-windings therefor in the circuits of the said dynamo-armatures.

28. As a means of regulation, two dynamos, armatures therefor mechanically connected together and electrically connected in a local circuit, means for electrically connecting said local circuit with a source of electric supply, field-windings therefor connected and arranged so that changes in the electrical condition of the circuits for which regulation is desired will vary the relative field strengths of said dynamos, a third dynamo, and field-windings therefor located in said local circuit.

29. As a means of regulation, two dynamos, armatures therefor mechanically connected together and electrically connected in a local circuit, field-windings therefor connected and arranged so that changes in the electrical condition of the circuits for which regulation is desired will vary the relative field strengths of said dynamos, a third dynamo, and field-windings therefor connecting the two armatures in said local circuit and connecting the local circuit with the source of supply.

30. As a means of regulation, two dynamos, armatures therefor mechanically connected together and electrically connected in a local circuit, field-windings therefor connected and arranged so that changes in the electrical condition of the circuits for which regulation is desired will vary the relative field strengths of said dynamos, a third dynamo whose armature is mechanically connected to the other two, and field-windings therefor in said local circuit.

31. As a means of regulation, three dynamo-armatures mechanically connected together, means for causing variations of electrical conditions in a circuit to alter the relative electrical conditions of two of the armatures, and means for causing said alteration to vary the electromotive force of the third armature.

32. As a means of regulation, three dynamo-armatures mechanically connected together, a local circuit including the armatures of two of said dynamos and a field-winding of the third dynamo, and means for varying the relative field strengths of the dynamos whose armatures are in the local circuit according to the change of circuit conditions for which regulation is desired.

33. As a means of regulation, three dynamo-armatures mechanically connected together, a local circuit including the armatures of two of said dynamos and a field-winding of the third dynamo, a circuit subject to changes of electrical condition, the field-windings of the dynamos whose armatures are in the local circuit being connected to such changing circuit and arranged so that the fields are differently influenced by such changes.

34. As a means for regulation, three dynamos mechanically connected together, means for varying the electromotive force of one of said dynamos in accordance with the variations of the relative electrical conditions of the other two, and a fourth dynamo whose field is excited by the first-mentioned dynamo.

35. As a means for regulation, a dynamo, an exciter therefor having a divided field-winding, two dynamos whose armatures are in a local circuit and in connection with the divided field-winding to oppositely affect the electromotive force of the exciter, and means for causing variations of circuit conditions to vary the relative electrical conditions of said armatures.

36. As a means for regulation, a dynamo, an exciter therefor, two other dynamos, a mechanical connection between the armatures of the exciter and of the said two other dynamos, a local circuit containing the latter armatures and the field-winding of the exciter, and a connection to said local circuit through said exciter field-winding.

37. The combination with the supply-conductors of a system of distribution, of a pair of electromotive-force generators placed in other conductors, a controlling-coil for one of said electromotive-force generators placed in shunt to a circuit whose voltage varies and acting to vary the electromotive force of one of said generators in accordance with said voltage variations, a third electromotive-force generator, and means for causing alterations in the relative electrical conditions of the first-mentioned electromotive-force generators to vary the electromotive force produced by said third generator.

38. The combination with the supply-conductors of a system of distribution, of a pair of dynamos whose armatures are placed in other conductors, a field-winding for one of said dynamos placed in shunt to a circuit whose voltage varies and acting to vary the electromotive force of one of said dynamos in accordance with said voltage fluctuations, a third dynamo, and means for causing alterations of the relative electrical conditions of the said dynamo-armatures to vary the electromotive force produced by said third dynamo.

39. The combination with the supply-conductors of a system of distribution, of a pair of dynamos whose armatures are placed in other conductors, a field-winding for one of said dynamos placed in shunt to a circuit whose voltage varies and acting to vary the electromotive force of one of said dynamos in accordance with said voltage fluctuations, a third dynamo and field-windings therefor in the circuits of the said dynamo-armatures.

40. As a means of regulation, a circuit with varying voltage, a local circuit, dynamo-armatures therein, a field-winding for one of the dynamos connected across said varying-voltage circuit and acting to vary the field strength of one of the dynamos in accordance with such variations of voltage, and a third dynamo having a field-winding in said local circuit.

41. As a means of regulation, a circuit with varying voltage, a local circuit, dynamo-armatures therein, a field-winding for one of the dynamos connected across said varying-voltage circuit and acting to vary the field strength of one of the dynamos in accordance with such variations of voltage, a third dynamo having a field-winding in said local circuit, and a connection to a point in said field-winding from a source of supply.

42. In an electrical system of distribution, a dynamo, a pair of dynamo-armatures connected in the field-circuit thereof, field-windings for such armatures connected across a part of the system so as to receive a varying voltage and means for causing the variations of the voltage across the system to affect one of the dynamo-armatures more than the other.

43. In a system of autoregulation, two dynamos having their field-windings connected across a circuit, one of the field-magnets being substantially saturated at the same given voltage across that circuit while the other of said field-magnets is considerably below saturation.

44. A main dynamo, a storage battery, a booster in circuit with the battery, an exciter for said booster, two dynamos controlling the electromotive force of said exciter by alterations in their relative electrical conditions and means for causing variations in electrical conditions of the system to produce said alterations.

45. A main dynamo, a storage battery, a booster in circuit with the battery, an exciter for the booster, two dynamos in circuit with field-windings of said exciter and means for causing variations in electrical conditions of the system to vary the field strengths of the said two dynamos relative to each other.

46. A main dynamo, a storage battery, a booster in circuit with the battery, an exciter for the booster, two dynamos in parallel and the field-winding of the exciter in a local circuit, a connection from a point in said field-winding to the system, and means for causing variations in electrical conditions of the system to vary the field strengths of the said two dynamos relative to each other.

47. A main dynamo, a storage battery, a booster in circuit with the battery, an exciter for the booster, two dynamos in parallel and the field-winding of the exciter in a local circuit, a connection from a point in said field-winding to the system, means for causing variations in electrical conditions of the system to vary the field strengths of the said two dynamos relative to each other and a mechanical connection between the armatures of the exciter and the two said dynamos.

48. A main dynamo, a storage battery, a booster in the battery-circuit, a controlling-coil for said booster located in a local circuit in connection with a source of electric supply, two dynamo-armatures in the said local circuit, and means for causing variations in the electrical condition of the system to vary the relative electrical conditions of said dynamo-armatures.

49. A main dynamo, a storage battery, a booster in the battery-circuit, a controlling-coil for said booster located in a local circuit, two dynamo-armatures in the said local circuit, a connection from said local circuit to a source of electric supply, and means for causing variations in the voltage of the system to vary the relative electrical conditions of said dynamo-armatures.

50. The combination of a main dynamo, a storage battery in parallel therewith, and a means for regulating the battery-circuit, comprising two electromotive-force generators connected with a source of electric supply, means for causing variations of circuit conditions to alter the relative conditions of the two electromotive-force generators, a third electromotive-force generator, and means for causing said alterations to affect the electromotive force of the third generator.

51. The combination of a booster, its armature and field-coils, and a regulating apparatus for the booster-field coils, comprising three dynamo-electric machines, one of which excites said booster-field coils and is itself excited by the currents of the other two.

52. The combination of a booster, its armature and field-coils, and a regulating apparatus for the booster-field, comprising three dynamo-electric machines mechanically connected together, one of which excites said booster-field coils and is itself excited by the currents of the other two.

53. A dynamo, and means for causing the electromotive force of said dynamo to vary from zero in either direction in accordance as two other dynamos connected to a source of supply vary relatively to each other from a condition in which both are motors receiving substantially equal currents.

54. A dynamo, an exciter therefor, and means for causing the electromotive force of said exciter to vary from zero in either direction in accordance as two other dynamos connected to a source of supply vary relatively to each other from a condition in which both are motors receiving substantially equal currents.

In testimony whereof I have signed my name to this specification in the presence of two subscribing witnesses.

ALBERT S. HUBBARD.

Witnesses:
RICHARD EYRE,
EDWIN SEGER.

---

It is hereby certified that in Letters Patent No. 798,038, granted August 22, 1905, upon the application of Albert S. Hubbard, of Greenwich, Connecticut, for an improvement in "Apparatus for Electrical Regulation," errors appear in the printed specification requiring correction, as follows: In line 98, page 2, the third line of claim 43, the letter "a" before the word "circuit" should read *the same*, and in line 99, same page, the fourth line of claim 43, the words "the same" should read *a;* and that the said Letters Patent should be read with these corrections therein that the same may conform to the record of the case in the Patent Office.

Signed and sealed this 10th day of October, A. D., 1905.

[SEAL.]

F. I. ALLEN,
*Commissioner of Patents.*